US009462138B2

(12) United States Patent
Cornforth et al.

(10) Patent No.: US 9,462,138 B2
(45) Date of Patent: Oct. 4, 2016

(54) CELLULAR AIRTIME MANAGEMENT

(71) Applicant: Vodafone IP Licensing Limited, Berkshire (GB)

(72) Inventors: Peter Cornforth, Berkshire (GB); Jason Downing, Berkshire (GB); Gregory Reeve, Berkshire (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 13/946,636

(22) Filed: Jul. 19, 2013

(65) Prior Publication Data
US 2014/0057594 A1 Feb. 27, 2014

(30) Foreign Application Priority Data
Jul. 20, 2012 (GB) .................................. 1212920.1

(51) Int. Cl.
*H04M 17/00* (2006.01)
*H04M 15/20* (2006.01)
*H04M 15/00* (2006.01)

(52) U.S. Cl.
CPC ........... *H04M 17/20* (2013.01); *H04M 15/765* (2013.01); *H04M 15/78* (2013.01); *H04M 17/00* (2013.01); *H04M 17/204* (2013.01); *H04M 2215/7245* (2013.01)

(58) Field of Classification Search
CPC .. H04M 17/00; H04M 15/00; H04M 15/765; H04M 2215/724; H04M 17/20; H04M 15/7652; H04M 2215/7245; H04M 15/77; H04M 15/772; G06Q 20/10; G06Q 20/20; G06Q 20/3223; G06Q 20/04; G06Q 20/3674; G06Q 20/3821; G06Q 20/322; G06Q 20/425; G06Q 20/3229; H04W 12/06; H04W 88/14
USPC ............ 455/406, 407, 408, 409; 705/40, 34
See application file for complete search history.

(56) References Cited

U.S. PATENT DOCUMENTS

| 8,064,579 | B2 | 11/2011 | Mumford et al. |
| 2001/0016835 | A1* | 8/2001 | Hansmann ............. G06Q 20/04 705/40 |
| 2004/0037414 | A1 | 2/2004 | Pramodkumar et al. |
| 2006/0023856 | A1* | 2/2006 | Welton ....................... 379/114.2 |
| 2008/0096524 | A1* | 4/2008 | True et al. ..................... 455/406 |
| 2008/0119162 | A1* | 5/2008 | Sivalingam et al. ......... 455/408 |
| 2010/0075630 | A1* | 3/2010 | Tillitt et al. .................. 455/406 |

OTHER PUBLICATIONS

The Economics of M-PESA by William Jack Version Oct. 2009.*
Internet website http://www.vodacom.co.za/personal/services/m-pesa/aboutm-pesa, accessed Oct. 24, 2012, acknowledged by applicant at priority date.
GB Search Report for GB1212920.1 dated Oct. 22, 2012.

* cited by examiner

*Primary Examiner* — Nizar Sivji
(74) *Attorney, Agent, or Firm* — B. Aaron Schulman, Esq.; Stites & Harbison, PLLC.

(57) ABSTRACT

Method and system for crediting cellular accounts with airtime comprising exchanging funds within a mobile telephone based money transfer system account for airtime. Crediting a plurality of cellular accounts with the airtime.

24 Claims, 3 Drawing Sheets

CELLULAR AIRTIME MANAGEMENT

FIELD OF THE INVENTION

The present invention relates to a system and method crediting cellular accounts with airtime using a mobile telephone based money transfer system.

BACKGROUND OF THE INVENTION

Purchase of airtime for pre-paid phones is traditionally completed using voucher scratch cards, bulk purchases of which can pose security risks as these are easily sold for cash. Supply of vouchers to employees may lead to fraud and other losses as vouchers may be lost before being applied to the intended cellular accounts. It may not be desirable or feasible to provide all company employees with post-paid or contract cellular telephones, however.

Purchasing airtime voucher cards in bulk and loading airtime on to phones on an individual basis is an overhead on a business or other organisation. This may be especially the case where many cellular phone accounts need to be managed.

Alternatives include enabling employees to purchase airtime and expense costs back through the business. However, in many cases such trust may not be provided to employees within small and medium enterprises in these environments.

Therefore, there is required a system and method that overcomes these problems.

SUMMARY OF THE INVENTION

Against this background and in accordance with a first aspect there is provided a method of crediting cellular accounts with airtime comprising the steps of:

allocating portions of a total amount of airtime to be distributed amongst a plurality of cellular accounts;

exchanging funds within a mobile telephone based money transfer system account for the total amount of airtime; and crediting the plurality of cellular accounts with the allocated portions of airtime. Therefore, multiple cellular accounts or phones may be "topped up" or credited with airtime (i.e. service credit, credit, talk-time, SMS credit, data or other resources). The cellular account may be the cellphone itself. The mobile telephone based money transfer system account may be one operated by a company, business, government, family or other organisation or any individual that administers or is responsible for several cellular accounts. A single (or multiple) transaction may exchange the funds for the total amount of airtime. The plurality of cellular accounts of phones may be credited with the determined portions of airtime simultaneously. A single instruction may cause the exchange of funds and credit the plurality of cellular accounts. The allocation of portions of airtime may be determined in advance or at the time of execution. Preferably, the allocation of portions is made before the exchange of funds occurs.

Preferably, the step of exchanging funds for the total amount of airtime may occur as a single transaction within the mobile telephone based money transfer system account. This makes the system easier to administer as a single payment or transaction may be made for multiple mobile accounts.

Preferably, each of the allocated portions of airtime may be limited for use by a single cellular account within the plurality of cellular accounts. This makes is easier to determine how much airtime is used by each user. Preferably, the airtime is created or placed by a mobile operator directly into each individual cellular account for use only by that cellular account.

Advantageously, the plurality of cellular accounts may be credited simultaneously or substantially at the same time. Therefore, multiple accounts may be credited more efficiently.

Preferably, the airtime may include or be denominated in any one or more of: service credit, talk-time, SMS credit, data, and money. Credit may include any advance-pay applied to the cellular account to allow the account and associated cellphone to function within a cellular network.

Optionally, the cellular accounts may be either all pre-paid cellular accounts, all post-paid cellular accounts or some pre-paid and some post-paid. The account types may differ in the group or plurality of accounts being credited.

Optionally, the plurality of cellular accounts may be credited with different quantities of airtime. The may also each be credited with the same amount.

Optionally, the plurality of cellular accounts may be categorised according to an amount of airtime to be credited. Different categories of cellular accounts (within the plurality of cellular accounts being credited) may be credited differently. This allows further flexibility and control. For example, cellular accounts may be assigned categories such as low, medium or high use, or according to function such as accounts, managers and sales.

Preferably, the cellular accounts may be credited at regular intervals. This may be daily, weekly or monthly, for example. The cellular accounts may also be credited on an ad hoc basis, as required.

Optionally, the method may further comprise the step of sending notifications to the cellular accounts when credited with airtime. This provides interested parties with notice of activity on the accounts.

Preferably, the notifications may be SMS messages to cellphones associated with the cellular accounts. In other words, the cellphones being credited or topped up may receive a SMS message when done.

Optionally, the method may further comprise the step of selecting the plurality of cellular accounts to be credited with airtime and/or the amount of airtime to be credited. Customisation of the crediting procedure may be achieved in this way. For example, a list may be created of selected cellular accounts. Accounts may be included, added, edited or removed as required. The amount of airtime may be selected or defined in terms of funds, talk-time, SMS credit, data, or any other suitable value.

Preferably, the step of exchanging funds may further comprise debiting the mobile telephone based money transfer system account by the value of the total amount airtime. Additional checks may be made to ensure that sufficient funds are available or credit may be extended if necessary and appropriate.

According to a second aspect, there is provided a system for crediting cellular accounts with airtime comprising logic configured to:

receive an instruction to credit a plurality of cellular accounts with portions of a total amount of airtime;

exchange funds within a mobile telephone based money transfer system account for the total amount of airtime; and credit the plurality of cellular accounts with the portions of airtime. The logic may take the form of a configured processor or instruction set, for example.

Preferably, the exchanging funds for the total amount of airtime may occur as a single transaction within the mobile telephone based money transfer system account. This makes the system easier to administer as a single payment or transaction may be made for multiple mobile accounts.

Preferably, each of the allocated portions of airtime may be limited for use by a single cellular account within the plurality of cellular accounts. This makes is easier to determine how much airtime is used by each user. Preferably, the airtime is created or placed by a mobile operator directly into each individual cellular account for use only by that cellular account.

Advantageously, the plurality of cellular accounts may be credited simultaneously or substantially at the same time.

Preferably, the logic may be further configured to debit the mobile telephone based money transfer system account by the value of the airtime.

Optionally, the system may further comprise a user interface configured to transmit the instruction to credit the plurality of cellular accounts with airtime. The user interface may take the form of a client, web interface, cellphone interface, terminal or other type, for example.

Optionally, the user interface is further configured to receive a selection of cellular accounts to credit with the portions of airtime and/or receive a value corresponding to the amount of airtime to be credited. The selection may be made by a user or administrator, for example. Secondary administrators provide additional security.

The methods described above may be implemented as a computer program comprising program instructions to operate a computer. The computer program may be stored on a computer-readable medium or sent as a signal.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale.

DETAILED DESCRIPTION OF THE PREFERRED EMBODIMENTS

Cell phone based money transfer systems such as M-PESA for example, provide a facility for transferring funds between mobile users. Cash may be exchanged for electronic money, which may be sent to family and friends, to pay bills or to purchase mobile airtime, for example. Such systems are designed to work on limited functionality mobile handsets using an installed SIM toolkit (STK) to provide additional menus dedicated to funds transfer, Unstructured Supplementary Service Data (USSD) sessions or interactive voice response (IVR) systems. SMS messages may be used to confirm to a sender and a receiver that an amount has been transferred following a transaction or payment. Cash may be redeemed or exchanged for electronic money (or "e-money") at outlets, which may be grocery stores or airtime resellers, for example.

Such money transfer systems are typically in use in countries with a limited banking infrastructure, where the population may not have access to basic financial services.

The system may also make use of the same low end mobile technologies (STK, USSD, IVR) to close a scheme that has already been created, through use of authorised administrators.

Businesses, families, governments and other organisations may use an appropriate interface to purchase and distribute airtime in bulk to a number of phone numbers. Tracking of airtime purchases for phone numbers or cellular accounts over time is also important as this allows spend to be managed more effectively. These two activities may be completed using e-money held within an existing mobile money transfer system, such as M-PESA for example, enabling more effective financial management.

Figure 1:
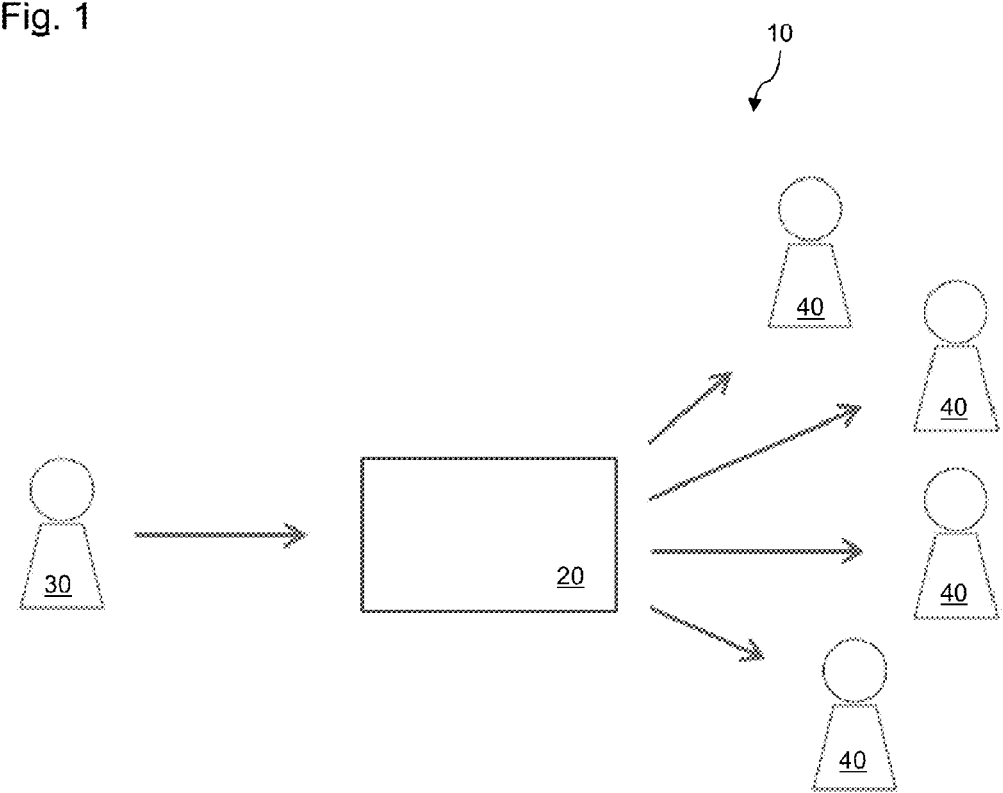
FIG. 1 shows a schematic diagram of a method of crediting cellular accounts with airtime.

FIG. 1 illustrates schematically a method 10 for crediting cellular accounts with airtime. The airtime is distributed from a central repository 20 managed by an administrator 30. The central repository 20 has an interface with a mobile telephone based money transfer system (not shown in this figure), which allows it to convert electronic money or e-money into airtime. The e-money is stored within an account of the mobile telephone based money transfer system. The administrator 30 has rights to this account.

In other words, funds within a mobile telephone based money transfer system account may be exchanged for airtime, which is credited to a plurality of cellular accounts 40 and associated separate mobile telephones. This provides central control and administrative convenience.

Security may be enhanced by providing a second administrator or organisation representative. This is illustrated schematically in FIG. 2 in which the administrator 30 initiates the conversion of funds within the mobile telephone based money transfer system account. Transaction details such as mobile numbers and amounts may be validated or authorised before processing continues. The second administrator 130 accepts or confirms the transaction, which then proceeds so that the electronic money is exchanged for airtime, which is then credited to the specified cellular accounts held by separate users.

One or more notifications, preferably in the form of SMS messages 110, may be issued to confirm once the transaction occurred. These notifications may be sent to any one or more of the administrator 30, the second administrator 130 and/or the separate cellular account holders that have been credited with airtime.

Figure 3:
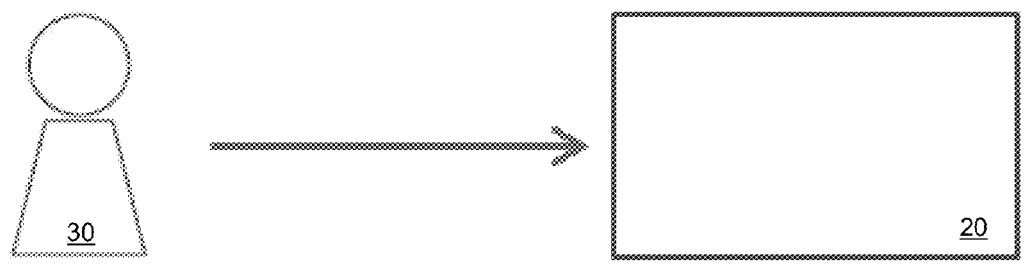
FIG. 3 shows a schematic diagram of further aspects of the method of FIG. 1.

FIG. 3 illustrates reporting aspects of the method and system. The central repository 20 records and stores transactions details including details of the amounts of airtime credited to particular cellular accounts, the date of the credits, the particular mobile telephone based money transfer system account that was used (where more than one may be available for use) and the administrator 30, 130 identities (several individuals may be authorised for both roles).

Therefore, a report may be produced when required or at regular intervals detailing the transactions.

Figure 2:
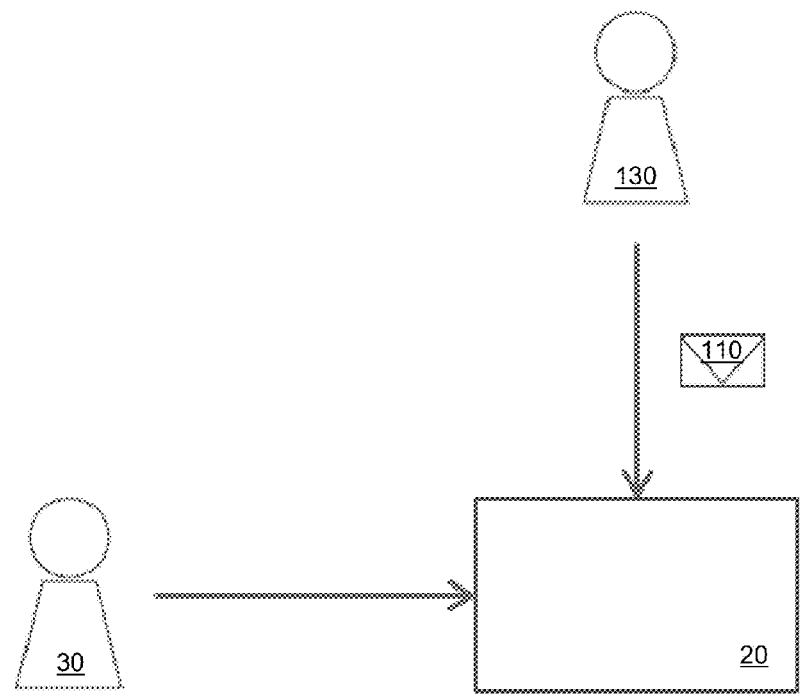
FIG. 2 shows a schematic diagram of further aspects of the method of FIG. 1.
Figure 4:
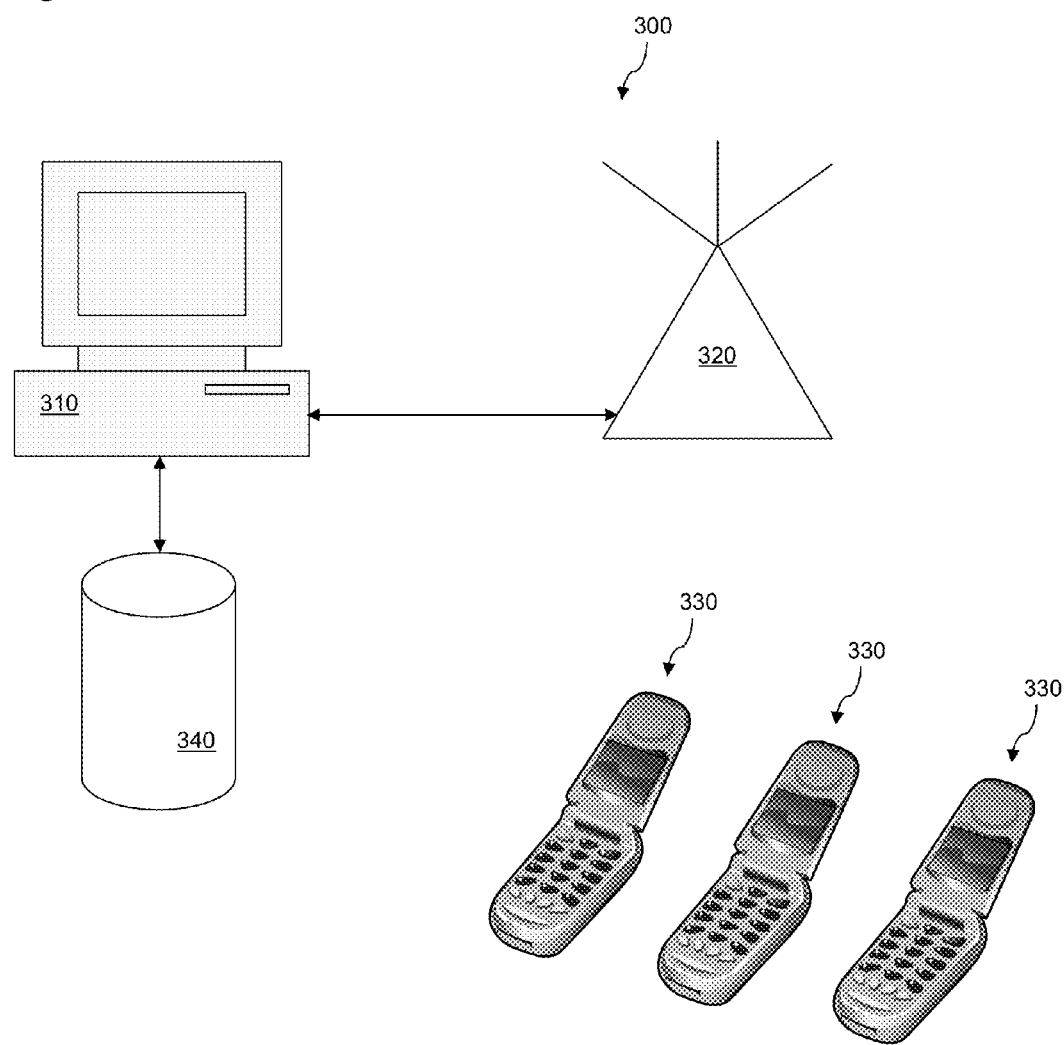
FIG. 4 shows a schematic diagram of a mobile telephone based money transfer system used to implement the method of FIG. 1.

FIG. 4 shows a schematic diagram of a system 300 for implementing the methods described with regards to FIGS. 1 to 3. A server 310 may administer one or more central repositories 20 and store their details in a database 340. The server 310 may also interface with the mobile telephone based money transfer system in order to debit the accounts with funds and convert these funds into airtime to be distributed to cellular accounts corresponding with cellular phones 330. Transmission of information throughout the system may utilise one or more mobile base stations 320. An account held by a network operator or other airtime provider may be credited with the funds debited from the company account. Corresponding airtime may be debited from the airtime provider or network operator when credited to the cellular accounts. Alternatively, the airtime may be held by the company for later crediting to the cellular accounts or phones. In other words, the method may include a delay between exchanging funds for airtime and crediting the airtime to the plurality of cellular accounts.

As will be appreciated by the skilled person, details of the above embodiment may be varied without departing from the scope of the present invention, as defined by the appended claims.

For example, other types of mobile telephones may be used such as for example, smart phones. The administrator 40 may use mobile apps and so avoid the menu based systems used with more limited functionality handsets. Other notifications may be sent. Different mobile technologies may be utilised.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method of crediting cellular accounts with airtime comprising the steps of:
    allocating portions of a total quantity of airtime to be distributed amongst a plurality of cellular accounts;
    accessing, via a server having an interface for communicatively coupling to a mobile telephone based money transfer system, a mobile telephone based money transfer system account that is maintained in association with a corresponding mobile telephone to debit an amount of electronic funds from the mobile telephone based money transfer system account for the total quantity of airtime that is allocated to be distributed amongst the plurality of cellular accounts; and
    crediting the plurality of cellular accounts with the allocated portions of airtime.

2. The method of claim 1, wherein debiting the amount of electronic funds from the mobile telephone based money transfer system account for the total quantity of airtime occurs as a single transaction within the mobile telephone based money transfer system account.

3. The method of claim 1, wherein each of the allocated portions of airtime are limited for use by a single cellular account within the plurality of cellular accounts.

4. The system of claim 1, wherein the plurality of cellular accounts are credited substantially simultaneously.

5. The method of claim 1, wherein the airtime includes or is denominated in any one or more of: service credit, talk-time, SMS credit, data, and money.

6. The method of claim 1, wherein the cellular accounts are either all pre-paid cellular accounts, all post-paid cellular accounts or some pre-paid and some post-paid.

7. The method of claim 1, wherein the plurality of cellular accounts are credited with different quantities of the total quantity of airtime.

8. The method of claim 1, wherein the plurality of cellular accounts are categorized according to corresponding quantities of the total quantity of airtime to be credited to the cellular accounts.

9. The method of claim 1, wherein the cellular accounts are credited at regular intervals.

10. The method of claim 1, further comprising the step of sending notifications to the cellular accounts when credited with airtime.

11. The method of claim 10, wherein the notifications are SMS messages to cell phones associated with the cellular accounts.

12. The method of claim 1 further comprising the step of selecting the plurality of cellular accounts to be credited with airtime and/or the quantity of airtime to be credited.

13. The method of claim 1, wherein the amount of electronic funds that is debited from the mobile telephone based money transfer system account corresponds to a value of the total quantity airtime.

14. The method of claim 1, wherein, in response to being credited with the amount of electronic funds debited from the mobile telephone based money transfer system account for the total amount of airtime, a mobile network operator issues the allocated portions of airtime to be distributed amongst the plurality of cellular accounts.

15. A system for crediting cellular accounts with airtime, the system comprising:
    a server having an interface for communicatively coupling to a mobile telephone based money transfer system, the server being configured to:
        receive an instruction transmitted from a client system to credit a plurality of cellular accounts with portions of a total quantity of airtime that are allocated from the total quantity of airtime to be distributed amongst the plurality of cellular accounts;
        direct, by accessing a mobile telephone based money transfer system account that is maintained in association with a corresponding mobile telephone via the interface, a debit of an amount of electronic funds within the mobile telephone based money transfer system account for the total quantity of airtime that is allocated to be distributed amongst the plurality of cellular accounts; and
        credit the plurality of cellular accounts with the allocated portions of airtime.

16. The system of claim 15, wherein the debit of the amount of electronic funds from the mobile telephone based money transfer system account for the total quantity of airtime occurs as a single transaction within the mobile telephone based money transfer system account.

17. The system of claim 15, wherein each of the portions of airtime are limited for use by a single cellular account within the plurality of cellular accounts.

18. The system of claim 15, wherein the plurality of cellular accounts are credited substantially simultaneously.

19. The system of claim 15, wherein the amount of electronic funds that the server is configured to direct the debit of from the mobile telephone based money transfer system account corresponds to a value of the total quantity of airtime.

20. The system of claim 15, further comprising a user interface implemented within the client system and configured to transmit the instruction to credit the plurality of cellular accounts with the allocated portions of airtime.

21. The system of claim 20, wherein the user interface is further configured to receive a selection of cellular accounts to credit with the allocated portions of airtime and/or receive a value corresponding to the quantity of airtime to be credited.

22. The system of claim 15, wherein, in response to being credited with the amount of electronic funds debited from the mobile telephone based money transfer system account for the total amount of airtime, a mobile network operator issues the allocated portions of airtime to be distributed amongst the plurality of cellular accounts.

23. A non-transitory computer-readable storage medium having program code embodied thereon, the program code executable by a processor to implement a method of crediting cellular accounts with airtime, the method comprising:
  allocating portions of a total quantity of airtime to be distributed amongst a plurality of cellular accounts;
  directing an access of a mobile telephone based money transfer system account that is maintained in association with a corresponding mobile telephone via an interface for communicatively coupling to a mobile telephone based money transfer system to perform a debit of an amount of electronic funds from the mobile telephone based money transfer system account for the total quantity of airtime that is allocated to be distributed amongst the plurality of cellular accounts; and
  crediting the plurality of cellular accounts with the allocated portions of airtime.

24. A computer apparatus, comprising:
  a processor, and a memory storing computer readable instructions for execution by the processor to perform a method of crediting cellular accounts with airtime, and wherein the method comprises:
    allocating portions of a total quantity of airtime to be distributed amongst a plurality of cellular accounts;
    directing an access of a mobile telephone based money transfer system account that is maintained in association with a corresponding mobile telephone via an interface for communicatively coupling to a mobile telephone based money transfer system to perform a debit of an amount of electronic funds from the mobile telephone based money transfer system account for the total quantity of airtime that is allocated to be distributed amongst the plurality of cellular accounts; and
    crediting the plurality of cellular accounts with the allocated portions of airtime.

* * * * *